United States Patent
Schonberger et al.

(10) Patent No.: US 12,372,665 B2
(45) Date of Patent: Jul. 29, 2025

(54) COLLECTING TELEMETRY DATA FOR 3D MAP UPDATES

(71) Applicant: Microsoft Technology Licensing, LLC, Redmond, WA (US)

(72) Inventors: Johannes Lutz Schonberger, Zurich (CH); Marc Andre Leon Pollefeys, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 17/751,193

(22) Filed: May 23, 2022

(65) Prior Publication Data

US 2023/0375365 A1    Nov. 23, 2023

(51) Int. Cl.
*G01S 19/46* (2010.01)
*G01C 21/00* (2006.01)
*G01S 19/47* (2010.01)

(52) U.S. Cl.
CPC .......... *G01S 19/46* (2013.01); *G01C 21/3844* (2020.08); *G01C 21/3859* (2020.08); *G01S 19/47* (2013.01); *G01C 21/3804* (2020.08)

(58) Field of Classification Search
CPC .......... G01S 19/46; G01S 19/47; G01S 19/51; G01S 21/3804; G01S 21/3602; G01C 21/3859; G01C 21/165; G01C 21/3844
USPC .............. 342/357.29, 357.3, 357.34
See application file for complete search history.

(56) References Cited

U.S. PATENT DOCUMENTS

| | | | |
|---|---|---|---|
| 9,251,590 B2 * | 2/2016 | Sharp | G06T 7/593 |
| 10,267,634 B2 * | 4/2019 | Chen | G01C 11/30 |
| 10,267,635 B2 * | 4/2019 | Chen | G01C 21/3635 |
| 11,073,403 B2 * | 7/2021 | Ahn | G01C 21/32 |
| 11,348,323 B2 * | 5/2022 | Kotake | G01B 11/26 |
| 11,512,964 B2 * | 11/2022 | Chen | G01C 21/3819 |
| 12,111,177 B2 * | 10/2024 | Zhang | G06V 10/764 |

(Continued)

FOREIGN PATENT DOCUMENTS

| | | | | |
|---|---|---|---|---|
| CN | 112559664 A | * | 3/2021 | G06F 16/23 |
| EP | 3875907 A1 | | 9/2021 | |

OTHER PUBLICATIONS

Bosse, et al., "Map Matching and Data Association for Large-Scale Two-dimensional Laser Scan-based SLAM", In Journal of the International of Robotics Research vol. 27, Issue 6, Jun. 2008, pp. 667-691.

(Continued)

*Primary Examiner* — Chuong P Nguyen
(74) *Attorney, Agent, or Firm* — Barta Jones, PLLC (57) ABSTRACT

A method for collecting telemetry data for updating a 3D map of an environment comprising carrying out a first relocalization event whereby: data from an observation at time t1 by a pose tracker is used to compute a first 3D map pose of the pose tracker, and a first local pose of the pose tracker at time t1 is received. A second relocalization event occurs where a second 3D map pose of the pose tracker is computed from data from an observation at time and a second local pose of the pose tracker at time t2 is received. A first relative pose between the first and second 3D map pose is computed. A second relative pose between the first and second local pose is computed. A residual being a difference between the first relative pose and the second relative pose is stored as input to a process for updating the 3D map.

20 Claims, 8 Drawing Sheets

(56) References Cited

U.S. PATENT DOCUMENTS

| | | | |
|---|---|---|---|
| 12,122,412 B2* | 10/2024 | Fasola | G01S 13/89 |
| 2006/0012493 A1* | 1/2006 | Karlsson | G01C 21/206 |
| | | | 701/532 |
| 2019/0219404 A1* | 7/2019 | Ahn | G01C 21/32 |

OTHER PUBLICATIONS

"International Search Report and Written Opinion Issued in PCT Application No. PCT/US23/016783", Mailed Date: Jul. 18, 2023, 13 Pages.

\* cited by examiner

COLLECTING TELEMETRY DATA FOR 3D MAP UPDATES

BACKGROUND

A 3D map of an environment is a collection of 3D positions in the environment and captured images associated with the 3D positions. The 3D positions are associated with objects such as points, lines, planes, shapes. The associations either result from the captured images depicting landmarks at 3D positions in the environment or from the images having been captured by capture devices with 3D positions and orientations in the environment. The environment which is mapped is any indoor or outdoor environment such as a domestic home, an office interior, a garden, a public rail station or other environment.

3D maps are used in a large range of applications and a non-exhaustive list of example applications is: navigation, hologram sharing and persistence, virtual and augmented reality, robotics, digital twins of buildings or other environments.

The embodiments described below are not limited to implementations which solve any or all of the disadvantages of known methods of collecting telemetry data for 3D map updates.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a method for collecting telemetry data for updating a 3D map of an environment. The method comprises carrying out a first relocalization event whereby: data from an observation at time t1 by a pose tracker is used to compute a first 3D map pose of the pose tracker, and a first local pose of the pose tracker at time t1 is received. A second relocalization event occurs where data from an observation at time t2 by the pose tracker is used to compute a second 3D map pose of the pose tracker and a second local pose of the pose tracker at time t2 is received. A first relative pose between the first and second 3D map pose is computed. A second relative pose between the first and second local pose is computed. A residual being a difference between the first relative pose and the second relative pose is stored as input to a process for updating the 3D map.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

A pose is an orientation and position in a coordinate frame such as a world coordinate frame or other coordinate frame. In various examples, the pose is a 6 degree of freedom (6DOF) pose comprising a 3 degree of freedom (3DOF) position and a 3DOF orientation. In other examples, the pose is a 7 degree of freedom pose comprising a 3DOF position, a 3DOF orientation and a scale. In further examples, the pose is a 4 degree of freedom pose comprising a 3DOF position and a 1 degree of freedom orientation or the pose is a 3DOF pose comprising 2 degree of freedom position and 1 degree of freedom orientation. Any combination of DOFs for orientation/position/scale are usable, depending on the application scenario.

A 3D map comprises sensor data items depicting an environment, each sensor data item having one or more associated variables. One example of an associated variable is a pose of a capture device, another example is a position of a landmark. The associations either result from the captured images depicting landmarks at 3D positions in the environment or from the images having been captured by capture devices with 3D positions and orientations in the environment. Images may be of any suitable type such as video frame, depth camera frame, web cam image, or infra-red image. Examples of sensor data include images, inertial measurement unit (IMU) data, videos, depth sensor data, laser scanner data, global positioning data, radio sensor data as well as other suitable data types. Global positioning data includes data from global positioning systems (GPS), (GNSS). Radio sensor data includes WiFi data, Bluetooth data, Ultra-wideband data and cellular internet data such as 2G, 3G, 4G, or 5G internet data.

There are a range of uses of 3D maps for which improved map accuracy and precision are desirable. Where 3D maps are used for robot navigation, greater map accuracy and precision reduces the chance of physical damage to the robot or its surroundings. In another example relating to hologram persistence, more accurate and precise maps help to ensure that a hologram is inserted into a viewer's environment in a realistic manner.

3D maps are optimized so as to find a 3D map which explains the sensor data in a coherent and consistent manner. During optimization, values of poses and/or positions in the map are adjusted to best explain a whole collection of many captured sensor data items depicting parts of the mapped region. Any suitable optimization method is used such as pose graph optimization or bundle adjustment.

The present disclosure is concerned with how to obtain telemetry data for use in map optimization, such as 3D map optimization in some examples, so as to improve map accuracy and precision. As a consequence, performance of services such as navigation and hologram sharing and persistence which use the 3D maps are also more accurate and precise.

Suitable telemetry data is difficult to obtain for a variety of reasons including privacy, security, lack of computational resources, lack of communications network bandwidth and others. Where telemetry data includes sensor data depicting the inside of a user's home, the faces of other people within the environment, or other personal information the raw sensor data is not usable for telemetry data due to security risk. On top of this, exchanging large amounts of sensor data can drain battery on a local device, slow the performance of a local device and use large amounts of communications bandwidth.

The technology described herein involves collecting telemetry data for updating a 3D map in a lightweight and privacy enhancing way. Lightweight means using minimal compute and network bandwidth overhead. The telemetry data is collected from one or more pose trackers. A pose tracker is functionality deployed in a computing device for computing a position and orientation of the computing device over time in a local coordinate frame. For example, a pose tracker is deployed in a smart phone, a robot, a head mounted display, a laptop computer, a game console, a smart watch, a self-driving vehicle, a drone, or any other computing device. Telemetry data can be collected from many different pose trackers and used to update a map of an environment the pose trackers are in, such as a city or building. The update process comprises computing an optimization over many poses and 3D positions in the 3D map to find values of the poses and 3D positions which give the best consistent explanation of sensor data associated with the poses and 3D positions. The optimization is arranged to minimize the residuals. In some cases the residuals have associated uncertainty data which is used to control how much influence individual ones of the residuals (or components of the residuals) have on the optimization process.

In various examples there is a method for collecting telemetry data for updating a 3D map of an environment. A first relocalization event is carried out whereby data from an observation at time t1 by a pose tracker is used to compute a first 3D map pose of the pose tracker and a first local pose of the pose tracker at time t1 is received. A second relocalization event is carried out whereby data from an observation at time t2 by the pose tracker is used to compute a second 3D map pose of the pose tracker and a second local pose of the pose tracker at time t2 is received. A first relative pose between the first and second 3D map pose is computed as well as a second relative pose between the first and second local pose. A residual is computed, the residual being a difference between the first relative pose and the second relative pose. The residual is stored as input to a process for updating the 3D map.

The residual mentioned above is telemetry data. Because the residual is difference data there is no absolute information about the pose of the pose tracker in the telemetry data and therefore privacy is enhanced; that is the absolute pose of the pose tracker is not revealed. Since the residual is computed using differences it is efficient to compute and uses only a small amount of a communication network's bandwidth, thus improving the resource allocation and functioning of the underlying device. In examples, telemetry data also comprises uncertainty data. Privacy is also enhanced due to the fact that the device does not need to send raw sensor data (like images) to the cloud to improve the map, thus improving management of network bandwidth resources.

In various examples, a pose tracker runs on a computing device to compute the device's local pose and uncertainty in a local coordinate frame of the device. Observations from the device are used to compute a 3D map pose and uncertainty in a global coordinate system against a map stored on a remote device e.g. the cloud. By collecting the local poses and 3D map poses and uncertainties over time as telemetry data, on-device tracking and local/remote maps can be improved. Computed relative poses between two points in time t1 and t2 are expected to be identical if local and remote maps as well as computation are perfectly accurate and precise. Any discrepancy (i.e. residual) between relative poses indicates an error in one or more of the local map, the remote map, the tracking method, or the method for computing the 3D map pose. Accounting for the uncertainties of the poses allows a relative pose residual or residuals to be inserted as correction terms into a map optimization procedure e.g. as hard or soft constraints.

A 3D map pose is a 3D position and orientation obtained by querying a 3D map. The 3D map is stored at any suitable location such as in the cloud, at a computing device which has a pose tracker, or at an entity in communication with a pose tracker.

A local pose is a term used in this document to mean a 3D position and orientation of a pose tracker which is computed by the pose tracker itself; that is, a local pose is computed locally by a pose tracker.

Uncertainty data is typically available associated with the outputs of the pose trackers and/or 3D maps. The uncertainty data indicates how certain the 3D map poses and/or local poses are. The uncertainty data is part of the telemetry data in some examples. In some examples where error in a pose is expected to follow a Gaussian distribution, the uncertainty associated with the pose is a covariance.

Telemetry data comprising residuals and optionally associated uncertainty data is usable to improve the accuracy and precision of any 3D maps of the environment where the pose trackers exist. That is, the 3D maps are at one or more of the pose trackers, at a device remote from the pose tracker for example a remote compute node, in the cloud, or at other entities.

The telemetry data relates to differences between two methods of obtaining a relative pose between a pose determined at a first time, t1, and a pose determined at a second time, t2. The first method involves determining 3D map poses (in a global coordinate frame) using 3D map relocalization and then finding a first relative pose. An error in each 3D map pose can be determined at the same time. This error is composed firstly of error introduced by the method of querying the map using pose tracker observations and secondly of error induced by global inaccuracy baked into the map between the two locations of the localization events. The error in 3D map relocalization is expected to be independent of distance and time. The second method involves measuring local poses (in a local coordinate frame) on a pose tracker and then finding a second relative pose. An error in each local pose measurement can be determined at the same time. Such an error in local pose tracking is expected to increase over distance and time as small errors from frame-to-frame tracking accumulate.

The difference between the first relative pose (derived from 3D map relocalization) and second relative pose (derived from measurements of a pose tracker) is the residual. The residual represents a combination of the error in each of the four pose measurements. Perfect measurements and accurate and precise 3D maps result in zero residual. Known error characteristics of the two methods for determining relative pose can be leveraged such that residual measurements help to improve the accuracy and precision of a 3D map. Residuals can also be used to measure map accuracy and precision between the two localization events, which can serve as a key performance indicator or for reporting quality metrics back to the user. Many residuals can be accumulated over time and from many pose trackers and multiple 3D map relocalization services in order to build an aggregate dataset for use in map optimization, such as 3D map optimization in some examples.

In some examples, the 3D map is stored on the cloud. In other examples the 3D map is stored on the pose tracker. In other examples a 3D map stored on the cloud and a 3D map stored on the pose tracker can be updated.

In some examples the local pose is observed from an inertial measurement unit IMU at the pose tracker. Using an IMU gives an efficient way to obtain the local pose just in time as part of the residual computation. In other examples, the local pose is observed from ultra-wide band technology at the pose tracker, electromagnetic tracking at the pose tracker, and/or camera tracking at the pose tracker. The camera tracking may use inside-out or outside-in cameras of an HMD.

Typically, the times t1 and t2 are in a same tracking session of the pose tracker. A tracking session is a duration where a pose tracker is able to compute its pose and does not lose track.

In various examples, computing the 3D map pose of the pose tracker comprises searching the 3D map to find data matching the data from an observation at time t1 made by the pose tracker. For example, the pose tracker has a camera which captures images of the environment. A search in the 3D map is made to find features matching features of the captured images.

In some examples, the 3D map poses are computed in the cloud. This gives the benefit that a complex 3D map stored in the cloud is usable, such as a 3D map of a city.

In some examples, the 3D map poses of the pose tracker are computed at the pose tracker using part of a 3D map stored in the cloud. The part of the 3D map is sent from the cloud to the pose tracker. This avoids sending derived features such as image features from the pose tracker to the cloud, leading to enhanced security.

In further examples, the part of the 3D map being sent to the pose tracker is determined based on received information sent from the pose tracker via a radio signal about the location of the pose tracker. The pose tracker location information may comprise global positioning system GPS data. Additionally or optionally the pose tracker location information identifies cellular base stations within communication range of the pose tracker. Information about the location of the cellular base stations is known and used to identify a location of the pose tracker.

In some situations, the pose tracker device may lose connection to the cloud for extended periods of time for example if a user takes the device into an area without WiFi signal. In some examples, the 3D map stored in the cloud is sent to the pose tracker before the pose tracker loses connection to the cloud, and the 3D map poses of the pose tracker are computed at the pose tracker using the 3D map while the pose tracker is not connected to the cloud. This means that residual data can be collected even during a period where the pose tracker is offline.

Residual data can be used in combination with error estimates to update a 3D map. In some examples the method additionally comprises using the residual and associated uncertainty data to update the 3D map. The uncertainty data is about any one or more of: the accuracy of 3D position computed by the pose tracker, the precision of 3D position computed by the pose tracker, the accuracy of orientation computed by the pose tracker, the precision of orientation computed by the pose tracker, the accuracy of position data in the 3D map, the precision of position data in the 3D map, the accuracy of orientation data in the 3D map, the precision of orientation data in the 3D map. In some cases sensors provide an estimate for both precision and accuracy which enables removing biases or variability from the maps.

The residual results from a combination of the error in determining a relative pose from pose tracker measurements and the error in determining a relative pose from poses computed using 3D map relocalization, which in turn is composed firstly of error introduced by the method of querying the map using pose tracker observations and secondly of error induced by global inaccuracy baked into the map between the two locations of the localization events. Uncertainty data representing the accuracy and/or precision in local pose measurements indicates how much of the residual is attributable to each measurement used to compute the residual. For example, in a scenario where the precision and accuracy in poses measured by the pose tracker are expected to be very high then the residual mostly results from error in 3D map relocalization and the residual represents a correction to the relative pose determined from 3D map relocalization. Comparison between the two methods of computing a relative pose means that the errors of each method can be leveraged against each other in order to provide more information to the process of updating 3D maps. In other scenarios, the precision or accuracy of position data within pose measurement may differ from the precision or accuracy of orientation data and this may similarly be taken into account in map optimization, such as 3D map optimization in some examples.

In further examples, the method comprises collecting a plurality of residuals, each having associated uncertainty data. The residuals and uncertainty data are used to update the 3D map by using the residuals and uncertainty data as constraints in an optimization process for optimizing the 3D map.

The plurality of residuals contains more information than a single residual, and therefore map optimization is more effective and results in more precise and accurate maps.

The plurality of residuals and uncertainty data may be computed from data from different pose trackers. Different types of pose tracker typically have different pose measurement accuracy and/or precision, and therefore including data from different types of pose tracker provides further information for map optimization.

The plurality of residuals and uncertainty data may also be computed using different 3D map relocalization services. Different 3D map relocalization services use different maps, generated from different data, and therefore including data from different 3D map relocalization services provides further information for map optimization.

In examples, there is a method for collecting telemetry data wherein in response to the pose tracker being in an area where the map is sparse, the first and second localization events are triggered. By triggering the localization events when the pose tracker is in an area where the 3D map is sparse, weak areas of the map can be improved with additional telemetry data. In areas where the map is not sparse, pose tracker and/or cloud resources are not used unnecessarily.

Figure 1:
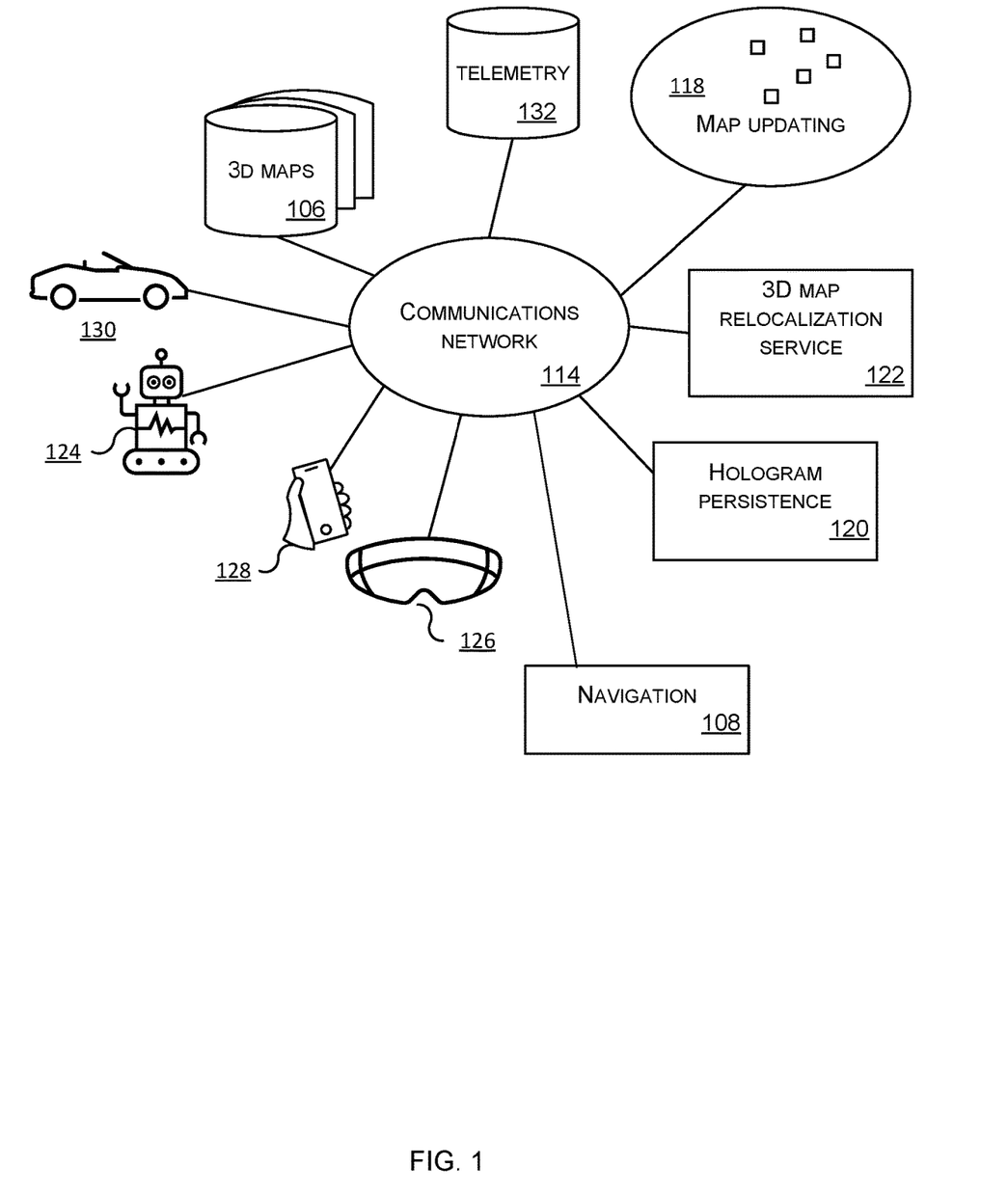
FIG. 1 is a schematic diagram of a 3D map relocalization service for use in collecting telemetry data for updating 3D maps.

FIG. 1 is a schematic diagram of a 3D map relocalization service 122 for use in collecting telemetry data for updating 3D maps. Map updating functionality 118 is deployed using a distributed architecture comprising a plurality of worker nodes and a management node which are in communication with one another. In an example the worker nodes and management node are deployed in a data centre, cluster of compute nodes or other computing functionality. The map updating functionality receives captured sensor data from one or more sensors via communications network 114. The sensors comprise cameras, inertial measurement units, or other sensors such as in smart phone 128, robot 124, augmented reality head worn computing device 126, self-driving car 130 or other sensors connected to communications network 114. The map updating functionality has access to one or more 3D maps 106 stored at locations accessible via communications network 114. The maps may be stored on a local pose tracking device such as in smart phone 128, robot 124, augmented reality head worn computing device 126, self-driving car 130. The maps may be stored in the cloud. The map updating functionality 118 updates and/or creates one or more of the 3D maps 106.

The 3D maps 106 are accessible via communications network 114, such as by a hologram sharing and persistence service 120 and by a navigation service 108. In an example, navigation service 108 is able to send a query to the 3D maps 106 to find image data associated with a given 3D position, or find a 3D position associated with a given image. In another example, navigation service 108 is able to download a region of a 3D map or a whole 3D map in order to plan routes and give directions to an end user, such as a user of smart phone 128, head worn augmented reality device 126, self-driving car 130 or robot 124.

Devices such as a smart phone 128, head worn augmented reality device 126, self-driving car 130 or robot 124 comprise pose trackers to track a local pose of the respective device. Sensor data depicting the local environment is used in tracking to generate a pose within a local coordinate frame. Examples of sensor data include images, inertial measurement unit (IMU) data, videos, depth sensor data as well as other suitable data types.

The pose trackers in the head worn augmented reality device 126, robot 124, self-driving car 130 and smart phone 128 as well as the 3D map relocalization service are able to implement the methods described below with reference to FIGS. 3 to 7 in order to compute telemetry data 132. The telemetry data 132 is used by the map updating functionality 118 or any other entity to update 3D maps.

The communications network 114 comprises a 3D map relocalization service 122. A query may be sent to the 3D map relocalization service along with data from pose tracker observations. The data from pose tracker observations is sensor data captured by the pose tracker or data derived from sensor data captured by the pose tracker. The data from pose tracker observations is used to query a 3D map in order to find a 3D map pose. In a typical scenario, 3D map relocalization service 122 is used whenever a pose tracker is turned on and its local tracking technology is initialized from scratch or when tracking fails for a short period of time. Furthermore, periodic relocalization is necessary to account for tracking drift during device usage. In examples described herein, the 3D map localization service 122 is used at additional times in order to facilitate computation of telemetry data 132.

Figure 2:
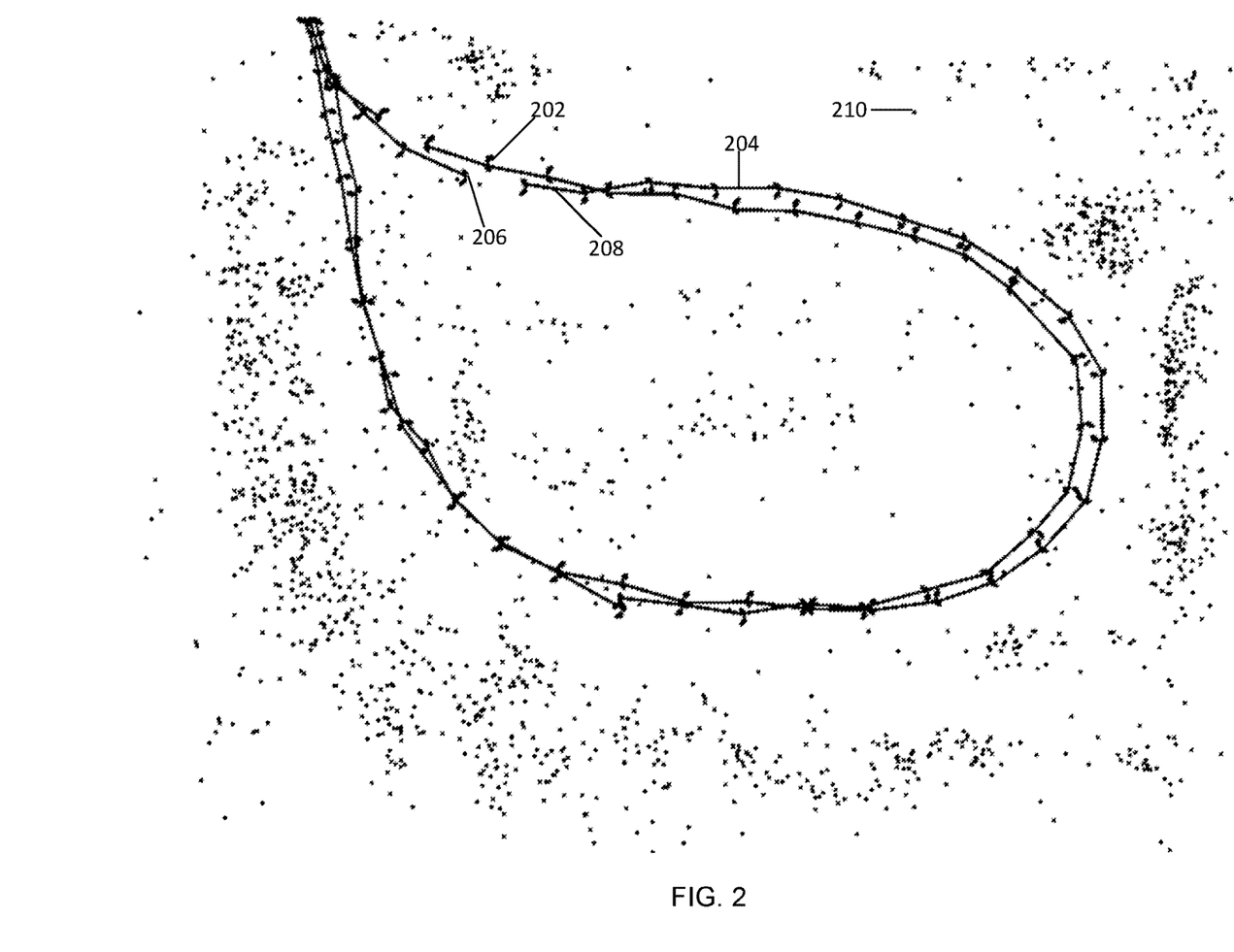
FIG. 2 is an example of a 3D map.

FIG. 2 is an example of a 3D map. The map comprises 3D positions of a plurality of landmarks. The map also comprises a relative trajectory of two capture devices. The solid black line 204 represents a trajectory of a first capture device. The solid black line 208 represents a trajectory of a second capture device. The solid points 202, 206 marked on each trajectory are the poses of the respective capture devices. The small black dots 210 shown in and around the trajectories 204, 208 are positions of landmarks in the environment to be optimized. In the example map of FIG. 2 there are 3D positions of landmarks and there are poses of capture devices. However, it is also possible to have a 3D map made up only of poses of capture devices, or only of 3D positions of landmarks.

Figure 3:
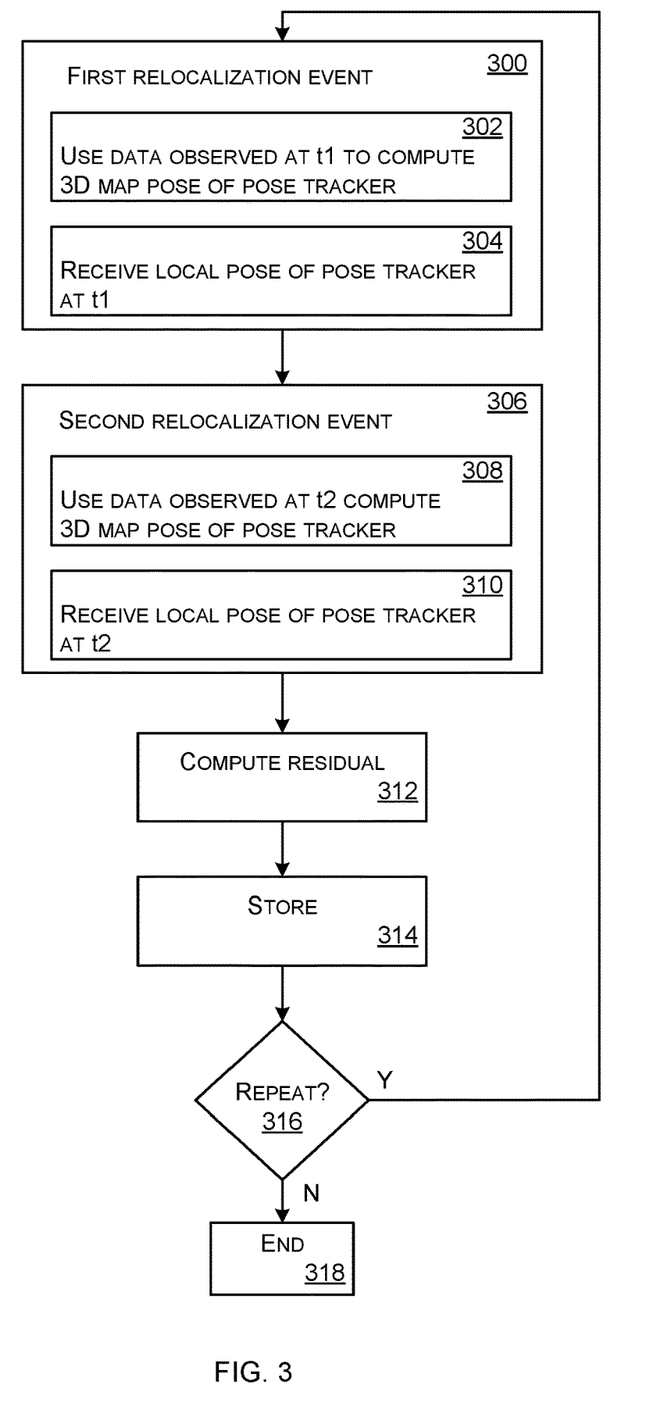
FIG. 3 is a flow diagram of a method of obtaining telemetry data for use in updating a 3D map.

FIG. 3 is a flow diagram of a method of obtaining telemetry data for use in updating a 3D map. The method comprises a first relocalization event 300 and a second relocalization event 306. At step 302 within the first relocalization event 300, data observed by a pose tracker at a time t1 is used to compute a first 3D map pose of the pose tracker (map_pose_1). Also within the first relocalization event 300, a first local pose of the pose tracker at time t1 (local_pose_1) is received 304.

At step 308 within the second relocalization event 306, data observed by a pose tracker at a time t2 is used to compute a second 3D map pose of the pose tracker (map_pose_2). Also within the second relocalization event 306, a second local pose of the pose tracker at time t2 (local_pose_2) is received at step 310. A residual is computed at 312 from the formula:

$$\text{residual} = (\text{local\_pose\_2} - \text{local\_pose\_1}) - (\text{map\_pose\_2} - \text{map\_pose\_1}).$$

At 314, the residual is stored as input to a process for updating the 3D map. The process of FIG. 3 is optionally repeated 316 in order to accumulate a plurality of residuals such as many hundreds or thousands of residuals or more.

FIG. 4, FIG. 5, FIG. 6, and FIG. 0.7 are schematic diagrams of various methods for obtaining telemetry data for updating a 3D map. The methods shown include various examples of first relocalization event 300, second relocalization event 306, residual computation 312, local_pose_1, local_pose_2, map_pose_1, and map_pose_2. In the examples in FIG. 4-FIG. 7 map_pose_1 and map_pose_2 are poses in a 3D map stored in the cloud or in a remote device separate from the pose tracking device. In some examples, map_pose_1 and map_pose_2 are computed at a 3D map relocalization service such as cloud 3D map relocalization service 122 of FIG. 1. In other examples map_pose_1 and map_pose_2 are computed locally at a pose tracker using a received portion of the 3D map stored in the cloud, or using any other 3D map local to the pose tracker. In the examples in FIG. 4-FIG. 7, local_pose_1 and local_pose_2 are poses of the pose tracker which are computed locally at the pose tracking device. In some examples, local_pose_1 and local_pose_2 are determined using tracking functionality of the pose tracker e.g. GPS measurements, IMU measurements. In some examples, local_pose_1 and local_pose_2 are determined using 3D map localization using a 3D map stored locally on the pose tracker. In various examples, the residual is computed at the pose tracker or at the 3D map relocalization service. In various examples, the residual(s) are used to update a 3D map stored in the cloud. In various examples, the residual(s) are used to update a 3D map stored locally at the pose tracker. The process of residual determination is optionally repeated many tens, hundreds or thousands of times or more using data from many different pose trackers.

Note that although the methods of FIGS. 4 to 7 are shown as separate methods, these methods are combinable in any combination. For example, the method of FIG. 4 comprises two relocalization events at a 3D map relocalization service in the cloud. The method of FIG. 4 can be combined with the method of FIG. 6 where the two relocalization events are computed at the pose tracker. The methods have been separated out into the various figures for clarity.

Figure 4:
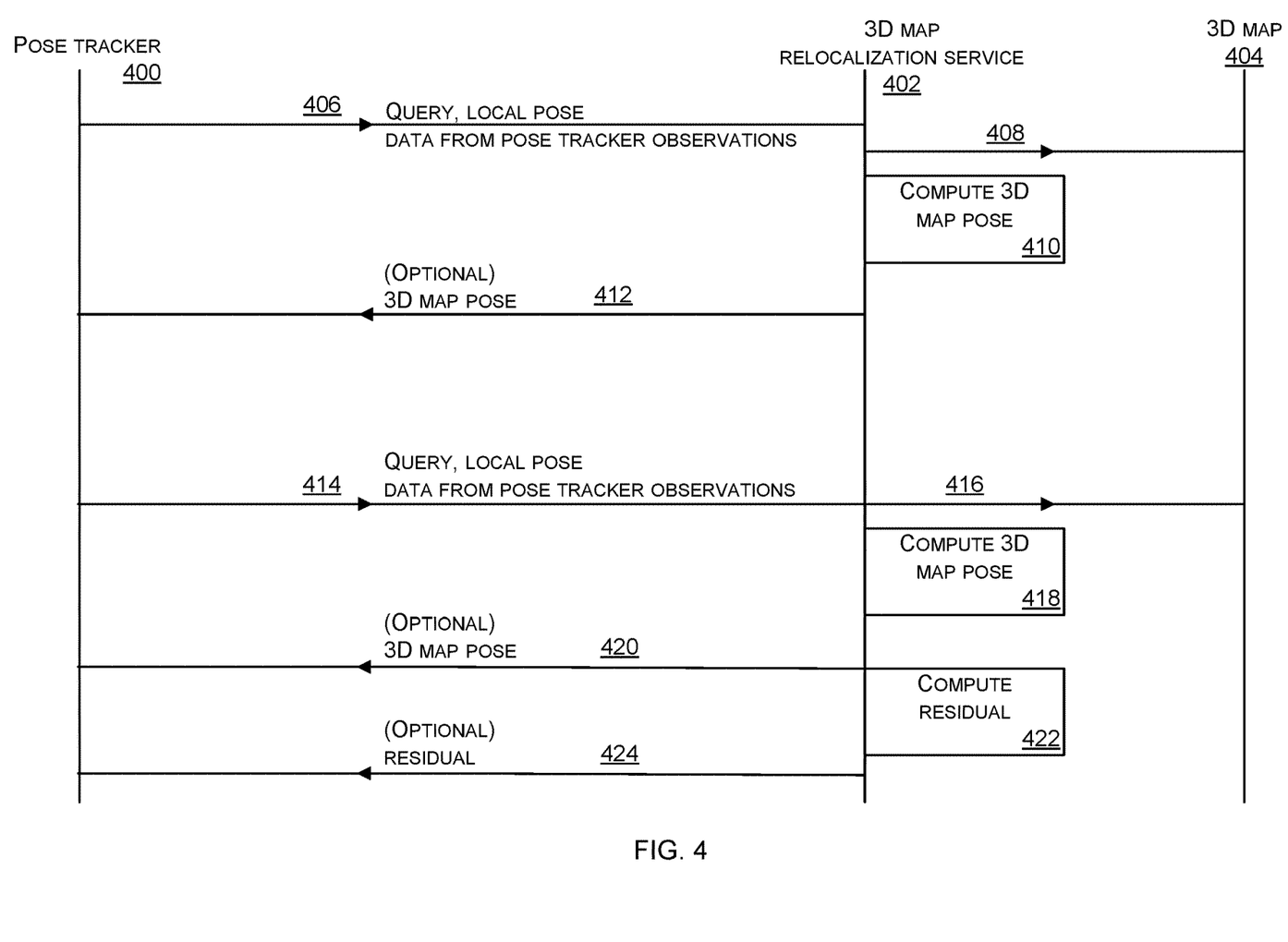
FIG. 4 is a schematic diagram of a method of obtaining telemetry data for use in updating a 3D map.

FIG. 4 is a schematic diagram of a method of obtaining telemetry data for use in updating a 3D map. A pose tracker 400 is represented by a vertical line as is a 3D map relocalization service 402 and a 3D map 404. Horizontal lines in FIG. 4 represent messages sent between the entities represented by the vertical lines. The relative vertical position of the horizontal lines represents chronological order of the messages.

At 406, data from pose tracker observations at time t1 is sent from a pose tracker 400 (such as any of 124, 126, 128 of FIG. 1) to a 3D map relocalization service 402 (such as 122 of FIG. 1), as part of a query and together with a local pose of the pose tracker at t1 (local_pose_1). The data from pose tracker observations is features derived from images or other sensor data captured by the pose tracker. The 3D map relocalization service 402 has an associated 3D map 404. At 408, the 3D map 404 is queried with data from pose tracker observations at time t1. The data is used to find a closest match in the 3D map i.e. a position and orientation in the 3D map with associated data which matches the derived features. At 410, the place in the 3D map is found at the 3D map relocalization service 402 and the place is map_pose_1 of the pose tracker. This is a first relocalization event. The 3D map pose is optionally sent back to pose tracker 400 at 412 where the 3D map pose can be used to relocalize the pose tracker if required.

Later in time a second relocalization event happens. At 414, data from pose tracker observations at time t2 is sent from the pose tracker 400 to a 3D map relocalization service 402, as part of a query and together with a local pose of the pose tracker at t2 (local_pose_2). The data from pose tracker observations comprises features derived from images or other sensor data captured by the pose tracker. At 416, the 3D map 404 is queried with data from pose tracker observations at time t2. The data is used to find a closest match in the 3D map i.e. a position and orientation in the 3D map which matches the derived features. At 418, the place in the 3D map is found at the 3D map relocalization service 402 and the place is map_pose_2 of the pose tracker.

At 422, a residual is computed at the 3D relocalization service 402 according to the formula (local_pose_2−local_pose_1)−(map_pose_2−map_pose_1). The residual can be used to update 3D map 404 stored on the cloud. The residual is optionally sent from 3D map relocalization service 602 to pose tracker 600 at 424. The residual can alternatively or additionally be used to update a local map stored on the pose tracker. Associated with the residual is uncertainty data as explained above. In some cases many residuals are collected by repeating the process of FIG. 4 and the plurality of residuals and associated uncertainty data are used in the 3D map update operation.

Figure 5:
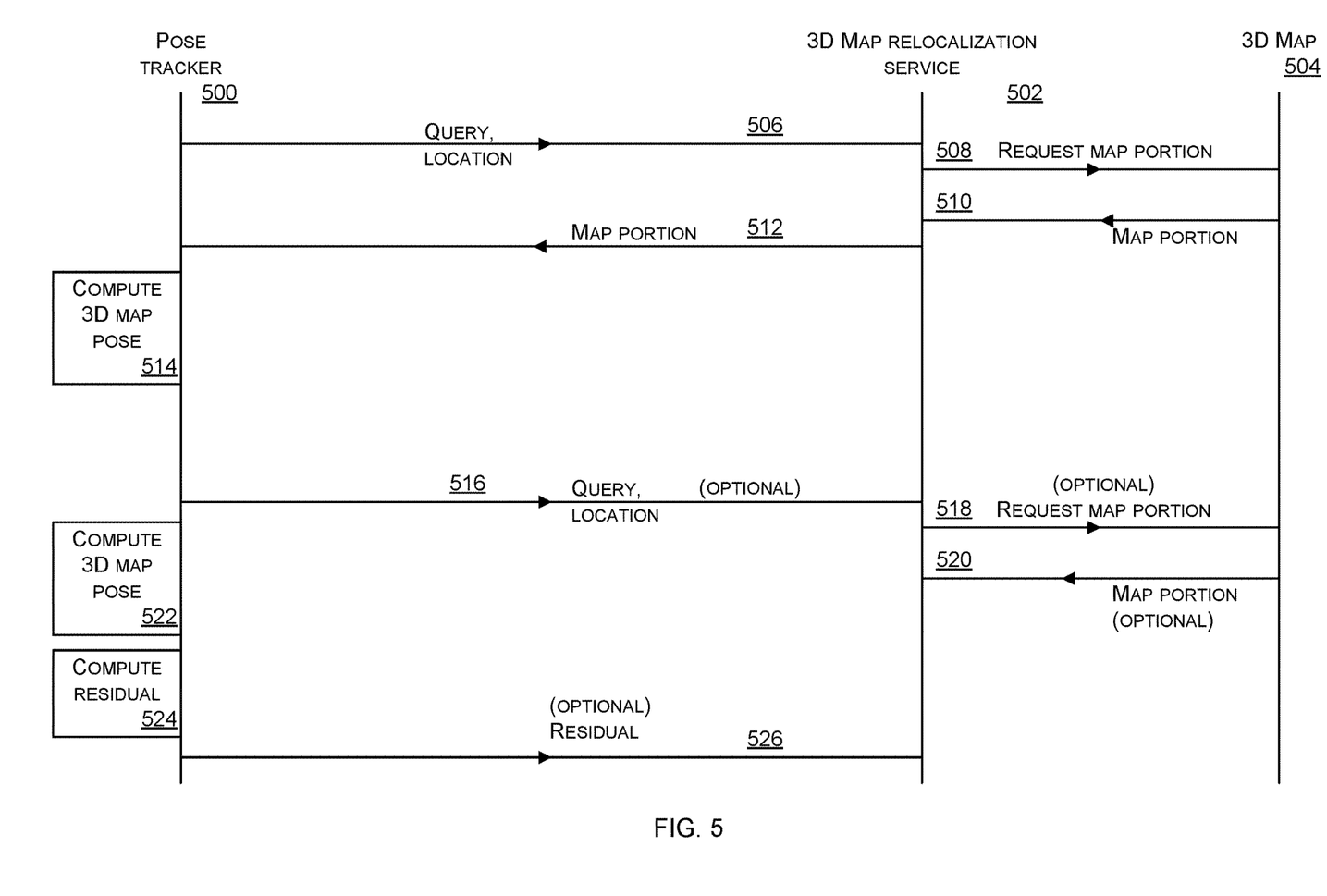
FIG. 5 is a schematic diagram of another method of obtaining telemetry data for use in updating a 3D map.

FIG. 5 is a schematic diagram of another method of obtaining telemetry data for use in updating a 3D map. FIG. 5 represents a pose tracker 500 using a vertical line, a 3D map relocalization service 502 as a vertical line and a 3D map as a vertical line 504. At 506, a query is sent along with location information relating to the pose tracker 500 at time t1 from pose tracker 500 to 3D map relocalization service 502. Examples of location information are identities of the two nearest mobile base stations, or a GPS signal received by the pose tracker. Based on the location data, a portion of a 3D map 504 is requested at step 508 by the 3D map relocalization service 502 from the 3D map 504. A map portion is obtained by the 3D map relocalization service at step 510 and sent to the pose tracker at 512. At the pose tracker, a position and orientation in the 3D map portion which matches the data is found (map_pose_1) at 514 using data related to pose tracker observations at time t1. The pose tracker also determines a local pose at time t1, which is local_pose_1.

At a later time t2, the pose tracker requests a different 3D map portion, for example if the location of the pose tracker has changed sufficiently. At 316, a query along with location information is sent from the pose tracker 500 to the 3D map relocalization service 502. Another map portion is requested at 518, obtained by the 3D map relocalization service at 520 and sent to the pose tracker at 528. A second 3D map pose, map_pose_2 is computed at 522 using data related to pose tracker observations at time t2. A closest match in a suitable 3D map portion i.e. a position and orientation in the 3D map portion which matches the data is found. The pose tracker also determines a local pose at time t2, which is local_pose_2.

A residual is computed at 534 and optionally sent to the 3D map relocalization service at 526, the residual being (local_pose_2−local_pose_1)−(map_pose_2−map_pose_1). The residual and optional uncertainty data associated with the residual can be used to update 3D map 504 stored on the cloud as part of a batch of residuals. Associated with the residual is uncertainty data as explained above. Additionally or optionally, the residual can be used to update a local map stored on the pose tracker.

In some scenarios, the entirety of 3D map 504 is sent to the pose tracker 500, for example when the pose tracker 500 anticipates being offline for an extended period of time. Many residuals may be computed at the pose tracker during the offline period to be sent in bulk to the 3D map relocalization service 502 at the end of the offline period.

Figure 6:
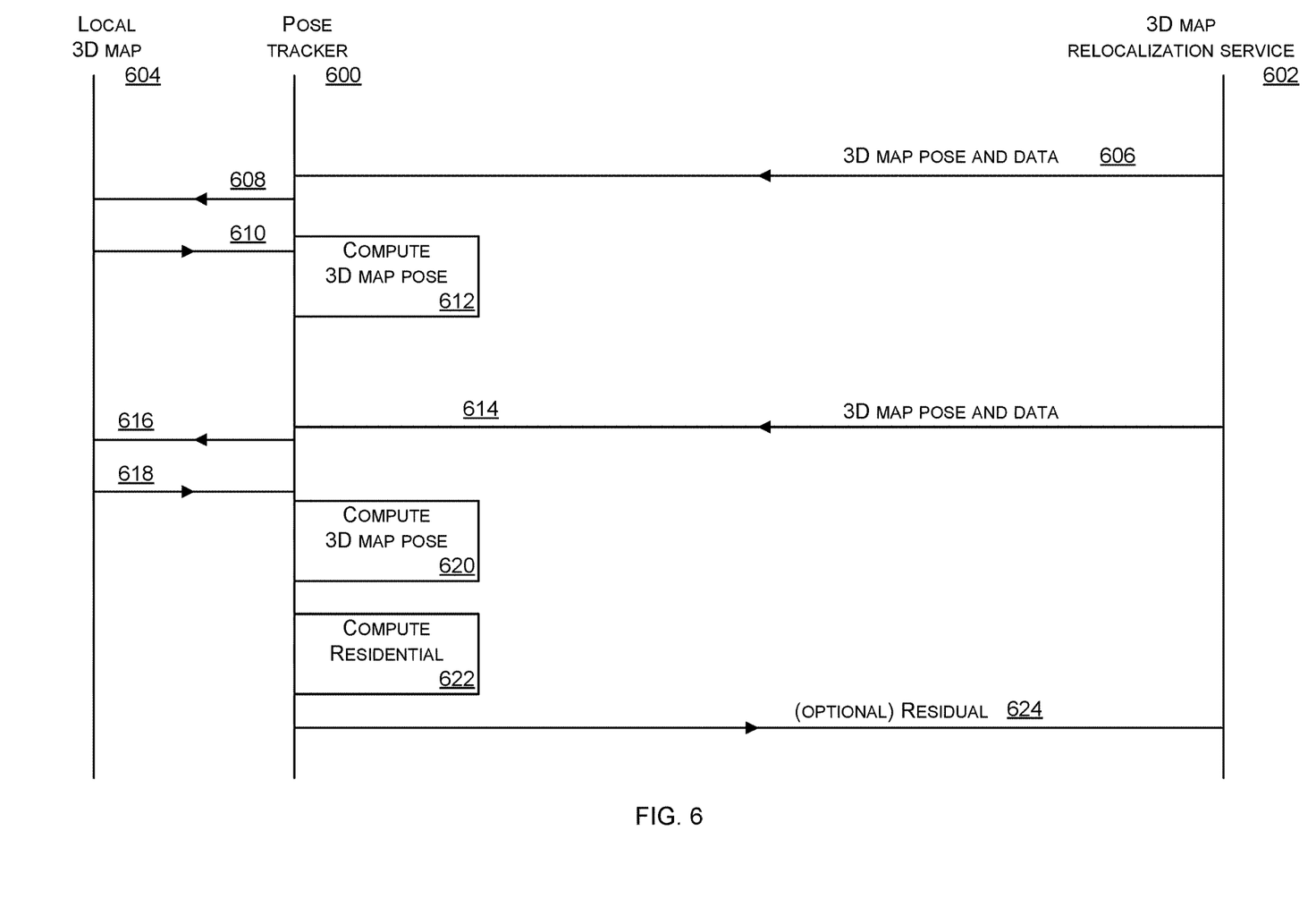
FIG. 6 is a schematic diagram of another method of obtaining telemetry data for use in updating a 3D map.

FIG. 6 is a schematic diagram of another method of obtaining telemetry data for use in updating a 3D map. In FIG. 6 a pose tracker 600 is represented as a vertical line, a local 3D map 604 is represented as a vertical line and is local to the pose tracker. A 3D map relocalization service 602 is represented as a vertical line. A 3D map pose (map_pose_1) in a 3D map used by a 3D map relocalization service 602 has data associated with it. For example, the associated data could be image features of a landmark in the environment being mapped or other features derived from sensor data. The data is sent from the 3D map relocalization service along with map_pose_1 to pose tracker 600 at 606. At 608, 610, 612 the data is used to query local 3D map 604 i.e. to find a position and orientation (local_pose_1) in the local 3D map stored on the pose tracker which matches the derived features obtained from the 3D map relocalization service. This is a first relocalization event.

At a later time, another 3D map pose (map_pose_2) is sent from 3D map relocalization service 602, along with associated data 614. In some cases, the associated data is sensor data derived features of a landmark in the environment being mapped. At 616, 618, 620 the local 3D map 604 stored on the pose tracker 600 is queried to find a position and orientation (local_pose_2) in the local 3D map stored local to the pose tracker which matches the derived features. This is a second relocalization event.

At 622 a residual is computed, the residual being (local_pose_2−local_pose_1)−(map_pose_2−map_pose_1). Associated with the residual is uncertainty data. The residual and any associated uncertainty data can be used to update the local 3D map 604. Optionally or additionally, the residual data and any associated uncertainty data can be used to update a map associated with the 3D map relocalization service. The residual is optionally sent to the 3D map relocalization service 602 at 624.

Figure 7:
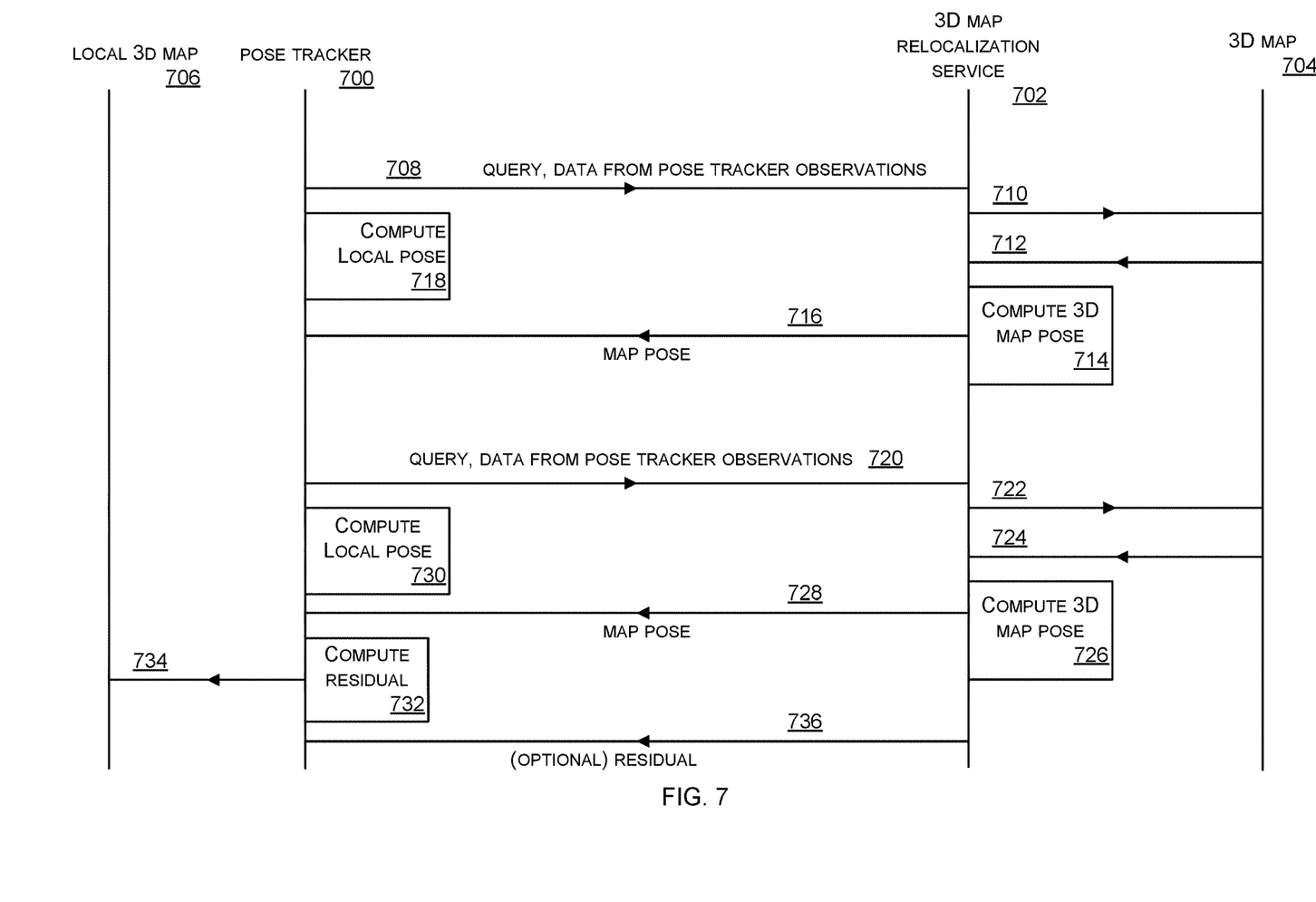
FIG. 7 is a schematic diagram of another method of obtaining telemetry data for use in updating a 3D map.

FIG. 7 is a schematic diagram of another method of obtaining telemetry data for use in updating a 3D map. At 708, data from pose tracker observations at time t1 is sent from the pose tracker 700 to a 3D map relocalization service 702, as part of a query. The pose tracker also determines a local pose of the pose tracker at t1 using its tracking technology (local_pose_1). The data from pose tracker observations is features derived from images or other sensor data captured by the pose tracker 700. The 3D map relocalization service 702 has an associated 3D map 704 in the. At 710,712 the 3D map 704 in the cloud is queried with data from pose tracker observations at time t1. The data is used to find a closest match in the 3D map i.e. a position and orientation in the 3D map 704 which matches the derived features. At 714, the place in the 3D map 704 is found at the 3D map relocalization service 702 and the place is map_pose_1. The 3D map pose is sent to pose tracker 700 at 716 where it is later used to compute a residual. This is a first relocalization event.

Later in time a second relocalization event happens. At 720, data from pose tracker observations at time t2 is sent from the pose tracker 700 to 3D map relocalization service 702, as part of a query. The pose tracker also determines a local pose of the pose tracker at t2 using its tracking technology (local_pose_2). The data from pose tracker observations is features derived from images or other sensor data captured by the pose tracker 700. At 722, 724 the 3D map 704 is queried with data from pose tracker observations at time t2. The data is used to find a closest match in the 3D map i.e. a position and orientation in the 3D map which matches the derived features. At 726, the place in the 3D map is found at the 3D map relocalization service 702 and the place is map_pose_2 of the pose tracker. The 3D map pose is sent to pose tracker 700 at 728.

At 732 a residual is computed according to the formula (local_pose_2−local_pose_1)−(map_pose_2−map_pose_1). Optionally, the residual is sent to 3D map relocalization service 702. The residual and any associated uncertainty data can be used to update the local 3D map 706 at 732. Additionally or optionally, the residual and any associated uncertainty data can be used to update 3D map 704. The residual is optionally sent to the 3D map relocalization service 702 at 736.

The computed residual or residuals determined using the methods shown in FIG. 4-FIG. 7 or using other methods are stored for use in a process of updating a 3D map.

When the local 3D map stored on the pose tracker or the 3D map of the 3D map relocalization service is next updated, the residual or residuals can be used along with uncertainty data which is estimated accuracy and/or precision of one or more of local_pose_1, local_pose_2, map_pose_1 and map_pose_2. The update process involves a global optimization of the poses and landmarks in the local map which is computationally intensive. The global optimization adjusts values of the poses and landmark positions to achieve the best, consistent explanation of sensor data depicting the environment being mapped. Error characteristic of local pose tracking and 3D map relocalization pose can be leveraged such that residual measurements help to improve the accuracy of a 3D map. Components of the residual which are more uncertain have less influence on the optimization process than components which are more certain.

The computation of residuals from two relocalization events of the disclosure operates in an unconventional manner to achieve the efficient collection and computation of telemetry data of the disclosure.

The computation of a residual from two relocalization events improves the functioning of the underlying computing device by enabling efficient collection of telemetry data for map optimization, such as 3D map optimization in some examples.

In some examples, the computed residual or residuals can be used to measure map accuracy and precision between the two localization events, which can serve as a key performance indicator or for reporting quality metrics back to the user.

Figure 8:
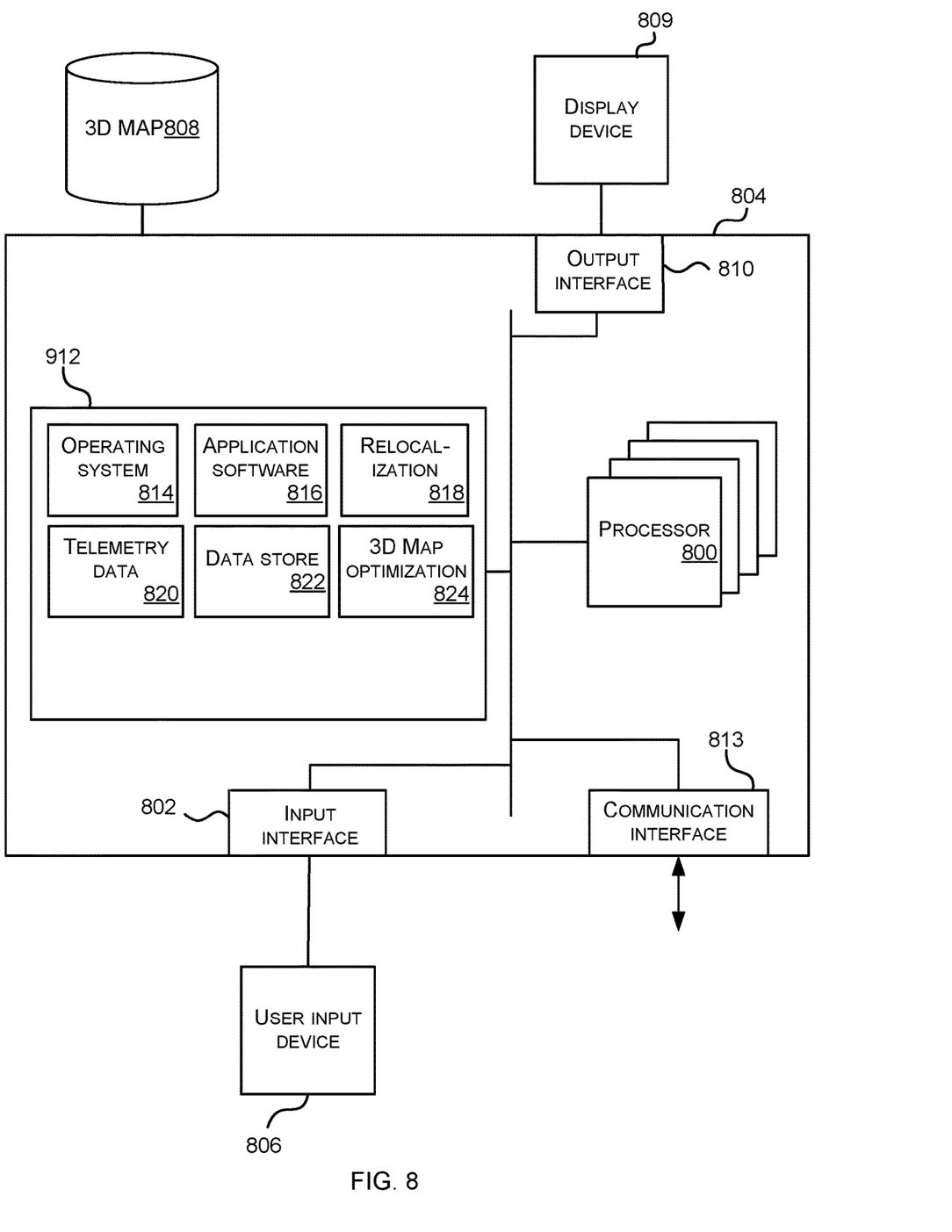
FIG. 8 illustrates an exemplary computing-based device in which example telemetry collecting functions, 3D map relocalization services or 3D map updating functionality, are implemented.

FIG. 8 illustrates an exemplary computing-based device in which example telemetry collecting functions, 3D map relocalization services or 3D map updating functionality, are implemented.

Computing-based device 804 comprises one or more processors 800 which are microprocessors, controllers or any other suitable type of processors for processing computer executable instructions to control the operation of the device in order to collect telemetry data, provide a 3D map relocalization service or map updating functionality. In some examples, for example where a system on a chip architecture is used, the processors 800 include one or more fixed function blocks (also referred to as accelerators) which implement a part of the method of FIG. 3, FIG. 4, FIG. 5, FIG. 6 or FIG. 7. in hardware (rather than software or firmware). Platform software comprising an operating system 814 or any other suitable platform software is provided at the computing-based device to enable application software 816 to be executed on the device. Other software that may be executed on the computing device 804 comprises: 3D map optimization engine 824 for carrying out 3D map optimization of an associated 3D map 808 and relocalization software 818 for finding a 3D map pose within associated 3D map 808 from features derived from sensor data. Data store 822 is provided to store such data as telemetry data 820, user configurable parameters, poses, sensor data, or other data.

The computer executable instructions are provided using any computer-readable media that is accessible by computing based device 804. Computer-readable media includes, for example, computer storage media such as memory 812 and communications media. Computer storage media, such as memory 812, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 812) is shown within the computing-based device 804 it will be appreciated that the storage is, in some examples, distributed or located remotely and accessed via a network or other communication link (e.g. using communication interface 813).

The computing-based device 804 also comprises an output interface 810 arranged to output display information to a display device 809 which may be separate from or integral to the computing-based device 804. The display information may provide a graphical user interface. The computing-based device 804 also comprises an input interface 802 arranged to receive and process input from one or more devices, such as a user input device 806 (e.g. a mouse, keyboard, camera, microphone or other sensor). In some examples the user input device 806 detects voice input, user gestures or other user actions and provides a natural user interface (NUT). In an embodiment the display device 809 also acts as the user input device 806 if it is a touch sensitive display device. The output interface 810 outputs data to devices other than the display device in some examples, e.g. a locally connected printing device (not shown in FIG. 8).

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Alternatively or in addition to the other examples described herein, examples include any combination of the following:

Clause A. A method for collecting telemetry data for updating a 3D map of an environment, the method comprising:
carrying out a first relocalization event whereby:
data from an observation at time t1 by a pose tracker, is used to compute a first 3D map pose of the pose tracker;
a first local pose of the pose tracker at time t1 is received;
carrying out a second relocalization event whereby:
data from an observation at time t2 by the pose tracker is used to compute a second 3D map pose of the pose tracker;
a second local pose of the pose tracker at time t2 is received;
computing a first relative pose between the first and second 3D map pose;
computing a second relative pose between the first and second local pose;
computing a residual being a difference between the first relative pose and the second relative pose;
storing the residual as input to a process for updating the 3D map.

Clause B. The method of clause A wherein the 3D map is stored at the pose tracker and in a cloud.

Clause C. The method of clause B further comprising using the residual as input to a process for updating the 3D map at one or more of: the pose tracker and the cloud.

Clause D. The method of any preceding clause wherein the first and second local pose is observed from external sensor data obtained by at least one external sensor at the pose tracker, wherein an external sensor is any one of: an inertial measurement unit IMU, ultra-wide band technology, electromagnetic tracking, camera tracking, global positioning system GPS data, global navigation satellite system GNSS data.

Clause E. The method of any preceding clause wherein the times t1 and t2 are in a same tracking session of the pose tracker.

Clause F. The method of any preceding clause wherein computing the 3D map pose of the pose tracker comprises searching the 3D map to find data matching the data from an observation at time t1 by the pose tracker.

Clause G. The method of any preceding clause wherein the 3D map poses of the pose tracker are computed in a cloud.

Clause H. The method of any preceding clause wherein the 3D map poses of the pose tracker are computed at the pose tracker using part of a 3D map stored in a cloud, the part of the 3D map being sent to the pose tracker.

Clause I. The method of clause H wherein the part of the 3D map being sent to the pose tracker is determined based on received information sent via a radio signal from the pose tracker about a location of the pose tracker, the information comprising global positioning system GPS data and/or information identifying cellular base stations within communication range of the pose tracker.

Clause J. The method of any preceding clause wherein the 3D map stored in the cloud is sent to the pose tracker before the pose tracker loses connection to the cloud, and the 3D map poses of the pose tracker are computed at the pose tracker using the 3D map while the pose tracker is not connected to the cloud.

Clause K. The method of any preceding clause further comprising: using the residual and associated uncertainty data to update the 3D map, where the uncertainty data is about any one or more of: an accuracy of 3D position computed by the pose tracker, a precision of 3D position computed by the pose tracker, an accuracy of orientation computed by the pose tracker, a precision of orientation computed by the pose tracker, an accuracy of position data in the 3D map, a precision of position data in the 3D map, an accuracy of orientation data in the 3D map, a precision of orientation data in the 3D map.

Clause L. The method of clause K comprising collecting a plurality of residuals, each having associated uncertainty data, and using the residuals and uncertainty data to update the 3D map by using the residuals and uncertainty data as constraints in an optimization process for optimizing the 3D map.

Clause M. The method of clause L wherein the plurality of residuals and uncertainty data are computed from data from different pose trackers.

Clause N. The method of clause M wherein the plurality of residuals and uncertainty data are computed using different 3D map relocalization services.

Clause O. The method of any preceding clause wherein in response to the pose tracker being in an area where the 3D map is sparse, triggering the first and second relocalization events.

Clause P. An apparatus comprising:
at least one processor;
a memory storing instructions that, when executed by the at least one processor, perform a method for updating a 3D map, the method comprising:
carrying out a first relocalization event whereby:
data from an observation at time t1 by a pose tracker, is used to compute a first 3D map pose of the pose tracker;
a first local pose of the pose tracker at time t1 is received;
carrying out a second relocalization event whereby:
data from an observation at time t2 by the pose tracker is used to compute a second 3D map pose of the pose tracker;
a second local pose of the pose tracker at time t2 is received;
computing a first relative pose between the first and second 3D map pose;
computing a second relative pose between the first and second local pose;
computing a residual being a difference between the first relative pose and the second relative pose;
storing the residual as input to a process for updating the 3D map.

Clause Q. The apparatus of clause P wherein the 3D map is stored in a cloud.

Clause R. The apparatus of clause P wherein the 3D map is located at the pose tracker.

Clause S. The apparatus of clause P wherein the first and second local pose is observed from an inertial measurement unit IMU at the pose tracker.

Clause T. An apparatus comprising:
at least one processor;
a memory storing instructions that, when executed by the at least one processor, perform a method for updating a 3D map stored in the cloud, the method comprising:
carrying out a first relocalization event whereby:
data from an observation at time t1 by a pose tracker is used to compute a first 3D map pose of the pose tracker;
a first local pose of the local device at time t1 is received;
carrying out a second relocalization event whereby:
data from an observation at time t2 by the pose tracker is used to compute a second 3D map pose of the pose tracker;
a second local pose of the local device at time t2 is received;
computing a first relative pose between the first and second 3D map pose;
computing a second relative pose between the first and second local pose;
computing a residual being a difference between the first relative pose and the second relative pose;
storing the residual as input to a process for updating the 3D map, and;
using the residual as a constraint to be minimized as part of an optimization process to update the map.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The configurations described above enable various methods for collecting telemetry data. It will be understood, however, that the methods here described, and others within the scope of this disclosure, may be enabled by different configurations as well. The methods herein, which involve the observation of people in their daily lives, may and should be enacted with utmost respect for personal privacy. Accordingly, the methods presented herein are fully compatible with opt-in participation of the persons being observed. In embodiments where personal data is collected on a local system and transmitted to a remote system for processing, that data can be anonymized in a known manner. In other embodiments, personal data may be confined to a local system, and only non-personal, summary data transmitted to a remote system.

What is claimed is:

1. A method for collecting telemetry data for updating a 3D map of an environment, the method comprising:
    carrying out a first relocalization event whereby:
        data from a first plurality of images or sensors at time t1 by a pose tracker is used to compute a first 3D map pose of the pose tracker, the pose tracker configured to compute a position and orientation of a computing device, the first 3D map pose being a 3D position and orientation of the pose tracker based on the 3D map; and
        a first local pose of the pose tracker at time t1 is received, the first local pose being a 3D position and orientation computed locally by the pose tracker;
    carrying out a second relocalization event whereby:
        data from a second plurality of images or sensors at time t2 by the pose tracker is used to compute a second 3D map pose of the pose tracker, the second 3D map pose being a 3D position and orientation of the pose tracker based on the 3D map; and
        a second local pose of the pose tracker at time t2 is received, the second local pose being a 3D position and orientation computed locally by the pose tracker;
    computing a first relative pose between the first and second 3D map pose;
    computing a second relative pose between the first and second local pose;
    computing a residual being a difference between the first relative pose and the second relative pose; and
    storing the residual as input to a process for updating the 3D map.

2. The method of claim 1 wherein the 3D map is stored at the pose tracker and in a remote device separate from the pose tracker.

3. The method of claim 2 further comprising using the residual as input to a process for updating the 3D map at one or more of: the pose tracker and the remote device separate from the pose tracker.

4. The method of claim 1 wherein the first and second local pose is observed from external sensor data obtained by at least one external sensor at the pose tracker, wherein an external sensor is any one of: an inertial measurement unit IMU, ultra-wide band technology, electromagnetic tracking, camera tracking, global positioning system GPS data, global navigation satellite system GNSS data.

5. The method of claim 1 wherein the times t1 and t2 are in a same tracking session of the pose tracker.

6. The method of claim 1 wherein computing the first 3D map pose of the pose tracker comprises searching the 3D map to find data matching the data from an observation at time t1 by the pose tracker.

7. The method of claim 1 wherein the first and second 3D map poses of the pose tracker are computed in a remote device separate from the pose tracker.

8. The method of claim 1 wherein the first and second 3D map poses of the pose tracker are computed at the pose tracker using part of a 3D map stored in a remote device separate from the pose tracker, the part of the 3D map being sent to the pose tracker.

9. The method of claim 8 wherein the part of the 3D map being sent to the pose tracker is determined based on received information sent via a radio signal from the pose tracker about a location of the pose tracker, the information comprising global positioning system GPS data and/or information identifying cellular base stations within communication range of the pose tracker.

10. The method of claim 1 wherein the 3D map stored in a remote device separate from the pose tracker is sent to the pose tracker before the pose tracker loses connection to the remote device, and the first and second 3D map poses of the pose tracker are computed at the pose tracker using the 3D map while the pose tracker is not connected to the remote device.

11. The method of claim 1 further comprising: using the residual and associated uncertainty data to update the 3D map, where the uncertainty data is about any one or more of: an accuracy of 3D position computed by the pose tracker, a precision of 3D position computed by the pose tracker, an accuracy of orientation computed by the pose tracker, a precision of orientation computed by the pose tracker, an accuracy of position data in the 3D map, a precision of position data in the 3D map, an accuracy of orientation data in the 3D map, a precision of orientation data in the 3D map.

12. The method of claim 11 comprising collecting a plurality of residuals, each having associated uncertainty data, and using the residuals and uncertainty data to update the 3D map by using the residuals and uncertainty data as constraints in an optimization process for optimizing the 3D map.

13. The method of claim 12 wherein the plurality of residuals and uncertainty data are computed from data from different pose trackers.

14. The method of claim 12 wherein the plurality of residuals and uncertainty data are computed using different 3D map relocalization services.

15. The method of claim 1 wherein in response to the pose tracker being in an area where the 3D map is sparse, triggering the first and second relocalization events.

16. An apparatus comprising:
    at least one processor;
    a memory storing instructions that, when executed by the at least one processor, perform a method for updating a 3D map, the method comprising:
        carrying out a first relocalization event whereby:
            data from a first plurality of images or sensors at time t1 by a pose tracker, is used to compute a first 3D map pose of the pose tracker, the pose tracker configured to compute a position and orientation of a computing device, the first 3D map pose being a 3D position and orientation of the pose tracker based on the 3D map; and
            a first local pose of the pose tracker at time t1 is received, the first local pose being a 3D position and orientation computed locally by the pose tracker;
        carrying out a second relocalization event whereby:
            data from a second plurality of images or sensors at time t2 by the pose tracker is used to compute a second 3D map pose of the pose tracker, the second 3D map pose being a 3D position and orientation of the pose tracker based on the 3D map; and a second local pose of the pose tracker at time t2 is received, the second local pose being a 3D position and orientation computed locally by the pose tracker;

computing a first relative pose between the first and second 3D map pose;

computing a second relative pose between the first and second local pose;

computing a residual being a difference between the first relative pose and the second relative pose; and storing the residual as input to a process for updating the 3D map.

17. The apparatus of claim 16 wherein the 3D map is stored in a remote device separate from the pose tracker.

18. The apparatus of claim 16 wherein the 3D map is located at the pose tracker.

19. The apparatus of claim 16 wherein the first and second local pose is observed from an inertial measurement unit IMU at the pose tracker.

20. An apparatus comprising:
at least one processor;
a memory storing instructions that, when executed by the at least one processor, perform a method for updating a 3D map stored in a cloud, the method comprising:
carrying out a first relocalization event whereby:
data from a first plurality of images or sensors at time t1 by a pose tracker is used to compute a first 3D map pose of the pose tracker, the pose tracker configured to compute a position and orientation of a computing device, the first 3D map pose being a 3D position and orientation of the pose tracker based on the 3D map; and a first local pose of a local device at time t1 is received, the first local pose being a 3D position and orientation computed locally by the pose tracker;

carrying out a second relocalization event whereby:
data from a second plurality of images or sensors at time t2 by the pose tracker is used to compute a second 3D map pose of the pose tracker, the second 3D map pose being a 3D position and orientation of the pose tracker based on the 3D map; and a second local pose of the local device at time t2 is received, the second local pose being a 3D position and orientation computed locally by the pose tracker;

computing a first relative pose between the first and second 3D map pose;

computing a second relative pose between the first and second local pose;

computing a residual being a difference between the first relative pose and the second relative pose;

storing the residual as input to a process for updating the 3D map, and using the residual as a constraint to be minimized as part of an optimization process to update the 3D map.

* * * * *